United States Patent
Kozomora et al.

(10) Patent No.: US 11,368,533 B2
(45) Date of Patent: Jun. 21, 2022

(54) SIGNALING BETWEEN MASTER AND ONE OR MORE SLAVE COMPONENTS TO SHARE ABSOLUTE AND INCREMENTAL DATA

(71) Applicant: Allegro MicroSystems, LLC, Manchester, NH (US)

(72) Inventors: Nevenka Kozomora, Windham, NH (US); Andrea Foletto, Andorno Micca (IT); Emanuele Andrea Casu, Annecy (FR)

(73) Assignee: Allegro MicroSystems, LLC, Manchester, NH (US)

( * ) Notice: Subject to any disclaimer, the term of this patent is extended or adjusted under 35 U.S.C. 154(b) by 9 days.

(21) Appl. No.: 16/952,215

(22) Filed: Nov. 19, 2020

(65) Prior Publication Data
US 2022/0159073 A1 May 19, 2022

(51) Int. Cl.
  *H04L 67/12* (2022.01)
  *H04L 1/00* (2006.01)
  *H04L 43/0811* (2022.01)
  *G07C 5/00* (2006.01)

(52) U.S. Cl.
  CPC .......... *H04L 67/12* (2013.01); *G07C 5/008* (2013.01); *H04L 1/0002* (2013.01); *H04L 43/0811* (2013.01)

(58) Field of Classification Search
  CPC ..... H04L 67/12; H04L 1/0002; H04L 43/081; G07C 5/008
  See application file for complete search history.

(56) References Cited

U.S. PATENT DOCUMENTS

| | | |
|---|---|---|
| 6,542,847 B1 | 4/2003 | Lohberg et al. |
| 6,687,644 B1 | 2/2004 | Zinke et al. |
| 7,747,146 B2 | 6/2010 | Milano et al. |
| 8,122,159 B2 | 2/2012 | Monreal |
| 8,461,782 B2 | 6/2013 | Ward et al. |
| 8,577,634 B2 | 11/2013 | Donovan et al. |
| 8,729,890 B2 | 5/2014 | Donovan et al. |
| 9,172,565 B2 | 10/2015 | Cadugan et al. |
| 9,252,945 B2* | 2/2016 | Lewis ................ H04L 9/3226 |
| 9,300,235 B2 | 3/2016 | Ng et al. |
| 9,552,315 B2 | 1/2017 | Monreal |

(Continued)

FOREIGN PATENT DOCUMENTS

| | | |
|---|---|---|
| DE | 196 34 714 A1 | 3/1998 |
| DE | 196 50 935 A1 | 6/1998 |

(Continued)

OTHER PUBLICATIONS

U.S. Appl. No. 17/009,111, filed Sep. 1, 2020, Ferrer et al.
(Continued)

*Primary Examiner* — Chandrahas B Patel
(74) *Attorney, Agent, or Firm* — Daly, Crowley, Mofford & Durkee, LLP (57) ABSTRACT

In one aspect, a system includes an electronic control unit (ECU) and an integrated circuit (IC). The IC is configured to transmit, to the ECU, absolute data on a message line at a first rate; and transmit, to the ECU, incremental data on an index line at a second rate. The second rate is faster than the first rate and the incremental data includes data associated with changes in the absolute data.

35 Claims, 11 Drawing Sheets

(56) References Cited

U.S. PATENT DOCUMENTS

| | | | |
|---|---|---|---|
| 9,634,715 | B2 | 4/2017 | Scheinkerman et al. |
| 9,739,846 | B2 | 8/2017 | Petrie et al. |
| 9,787,495 | B2 | 10/2017 | Vreeland et al. |
| 10,326,621 | B1 | 6/2019 | Geisler et al. |
| 10,747,708 | B2 | 8/2020 | Kozomora et al. |
| 11,119,969 | B2 * | 9/2021 | Okajima ............... G06F 15/17 |
| 11,215,982 | B2 * | 1/2022 | Urano ................. G05D 1/0022 |
| 2019/0306592 | A1 * | 10/2019 | Pusheck ................. H04L 67/12 |
| 2020/0386575 | A1 | 12/2020 | Weiland et al. |

FOREIGN PATENT DOCUMENTS

| | | |
|---|---|---|
| DE | 199 11 774 A1 | 12/1999 |
| EP | 0 944 888 A2 | 9/1999 |
| EP | 3 015 994 A1 | 5/2016 |
| JP | 2001-505691 A1 | 4/2001 |
| JP | 4142109 B2 | 8/2008 |
| WO | WO 98/25148 A2 | 6/1998 |
| WO | WO 2015/126539 A1 | 8/2015 |

OTHER PUBLICATIONS

White, "A Tutorial for the Digital SENT Interface;" Integrated Device Technology, Inc.; Retrieved from the Internet: https://aws1.disclosure-cdn.com/arduino/original/3X/d/5/d52079ebf8e81b5a95aae835ebaf1257b280f804.pdf on Jan. 18, 2022; Jan. 1, 2014; 4 Pages.

Extended European Search Report (EESR) dated Feb. 3, 2022 for European Application No. 21187747.7; 11 Pages.

* cited by examiner

SIGNALING BETWEEN MASTER AND ONE OR MORE SLAVE COMPONENTS TO SHARE ABSOLUTE AND INCREMENTAL DATA

BACKGROUND

Sensors are used to monitor various parameters of a system. For example, in vehicle systems, parameters such as current, speed, angle, linear position, and rotational direction of an article associated with a control module, such as a power steering module, a fuel injection module, and an anti-lock brake module, are often monitored. The sensor output signal is provided to a system controller, such as an Electronic Control Unit (ECU), that processes the sensor output signal and may generate a feedback signal for desired operation of the control module. Conventionally, the sensor updates the sensed parameter periodically and the system controller polls the sensor for data as needed for processing.

SUMMARY

In one aspect, a system includes an electronic control unit (ECU) and an integrated circuit (IC). The IC configured to transmit, to the ECU, absolute data on a message line at a first rate; and transmit, to the ECU, incremental data on an index line at a second rate. The second rate is faster than the first rate and the incremental data includes data associated with changes in the absolute data.

In another aspect, a system includes an electronic control unit (ECU) and a plurality of ICs. Each IC is configured to transmit, to the ECU, absolute data on a first line at a first rate and incremental data on a corresponding second line at a second rate.

In a further aspect, a system includes an electronic control unit (ECU) and a plurality of integrated circuits (IC) configured to transmit, to the ECU, primary data on a respective index line at a first rate, and to transmit, to the ECU, redundant and/or diagnostic data on a message line at a second rate. The second rate is slower than the first rate and the redundant data comprises primary data.

BRIEF DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the broad concepts, systems and techniques described herein. Like numbers in the figures denote like elements.

DETAILED DESCRIPTION

Described herein are various techniques for a master component and one or more slave components to communicate with each other. The techniques described herein use an additional line (called herein an "index line") that enables incremental data to be provided to the master component that allows for a faster updating of data than traditional techniques.

Figure 1A:
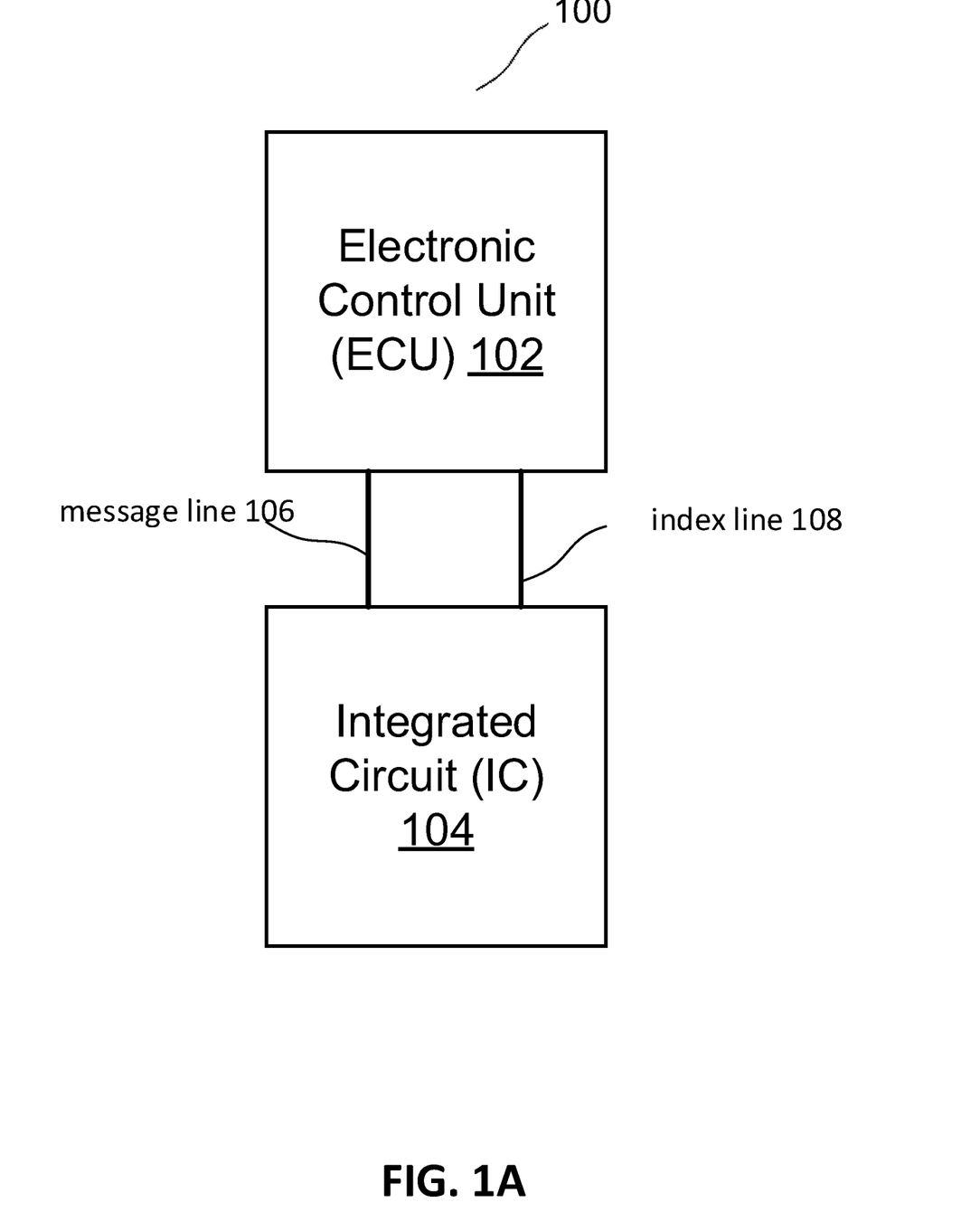
FIG. 1A is a block diagram of an example of a system to send absolute data and incremental data that includes an electronic control unit (ECU) and one integrated circuit (IC)

Referring to FIG. 1, a system 100 includes an electronic control unit (ECU) 102 (sometimes referred to as a "master component") and an integrated circuit (IC) 104 (sometimes referred to as a "slave component"). In one example, the IC 104 is a sensor such as, for example, a current sensor, a speed sensor, an angle sensor, a magnetic field sensor, a temperature sensor, a pressure sensor, a chemical sensor, a motion sensor, a rotational direction sensor, a linear position sensor and so forth. In other examples, the IC 104 may be a device providing sensing information received from an external sensor.

A message line 106 connects the ECU 102 to the IC 104 and an index line 104 connects the ECU 102 to the IC 104. In one example, the IC 104 provides absolute data to the ECU 102 using the message line 106, and the IC 104 provides incremental data using the index line 108. In some examples, a unidirectional format (e.g., Single-Edge Nibble Transmission (SENT) format) may be used by the IC 104 to transmit data to the ECU 102 on the message line 106. In other examples, a bidirectional format (e.g., a triggered SENT or Manchester format) may be used by the IC 104 to transmit data to the ECU 102 on the message line 106 after receiving a request from the ECU 102. In one example, the transport on the index line is synchronized with the predetermined point inside of the message on the data line (e.g. end of the synchronization nibble).

In one example, the index line 108 has two states (e.g., a high state and a low state). In one example, the IC 104 may go from a high state to a low state back to a high state to indicate an incremental change has occurred in the absolute data. In another example, the IC 104 may go from a low state to a high state back to a low state to indicate an incremental change has occurred in the absolute data.

In another example, a rising edge (e.g., a transition from a low state to a high state) may be used to indicate an incremental change has occurred in the absolute data. In this example, the high state may be kept constant.

In another example, a falling edge (e.g., from a high state to a low state) may be used to indicate an incremental change has occurred in the absolute data. In this example the low state may be kept constant.

In some examples, the IC 104 may use index lines 108 to indicate direction by using three-level pulses. For example, pulses above a reference level will indicate a clockwise direction and pulses below the reference level will indicate a counterclockwise direction; or vice versa.

In some examples, the IC 104 may use index lines 108 to indicate direction by using a pulse width or the time between pulses. For example, a pulse width of 1-microsecond indicates a clockwise direction while a two-microsecond pulse indicates a counterclockwise direction.

In some further examples, only the directional change is detected which may be done, for example, by a long signature pulse (e.g., a pulse that is longer than the other pulses). For example, a series of 1-microsecond pulses are received indicting a clockwise rotation. The 1-microsecond pluses are followed by a 4-microsecond pulse indicating a change in direction. The 4-microsecond pulse is followed by 1-microsecond pulses indicating a counterclockwise direction.

The IC 104 provides incremental data using the index 108 at a faster rate than the IC 104 provides absolute data using the message line 106. For example, some of the fastest SENT messages are sent on the message line 106 every 128 microseconds while the data sent on the index line 108 may be sent less than every 3 microseconds. The system 100 allows a faster response time to detect changes in the absolute data than traditional techniques that only use a message line.

In one particular example, the absolute data is a degree measurement (e.g., 275°) and the IC 104 sends incremental data using the index line 108 each time there is, for example, an incremental change (e.g., a 0.2-degree change) from the absolute data. In one particular example, the absolute data is a magnetic field intensity (e.g., 100 Oersted (Oe)) and the IC 104 sends incremental data using the index line 108 each time there is, for example, an incremental change (e.g., a 0.2-Oe change) from the absolute data.

The system 100 may be configured to allow the IC 104 to notify the ECU 102 of errors on the index line 108. For example, the IC 104 will pull the index line 108 to a low state. In another example, the IC 104 will pull the index line 108 to a high state.

In one example, if the message line 106 is broken, then the ECU 102 may use the index line 108 to confirm a constant position change and/or calculate a speed of the change. In another example, if the index line 108 is broken, then the ECU 102 may receive a position signal from the message line 106.

Figure 2A:
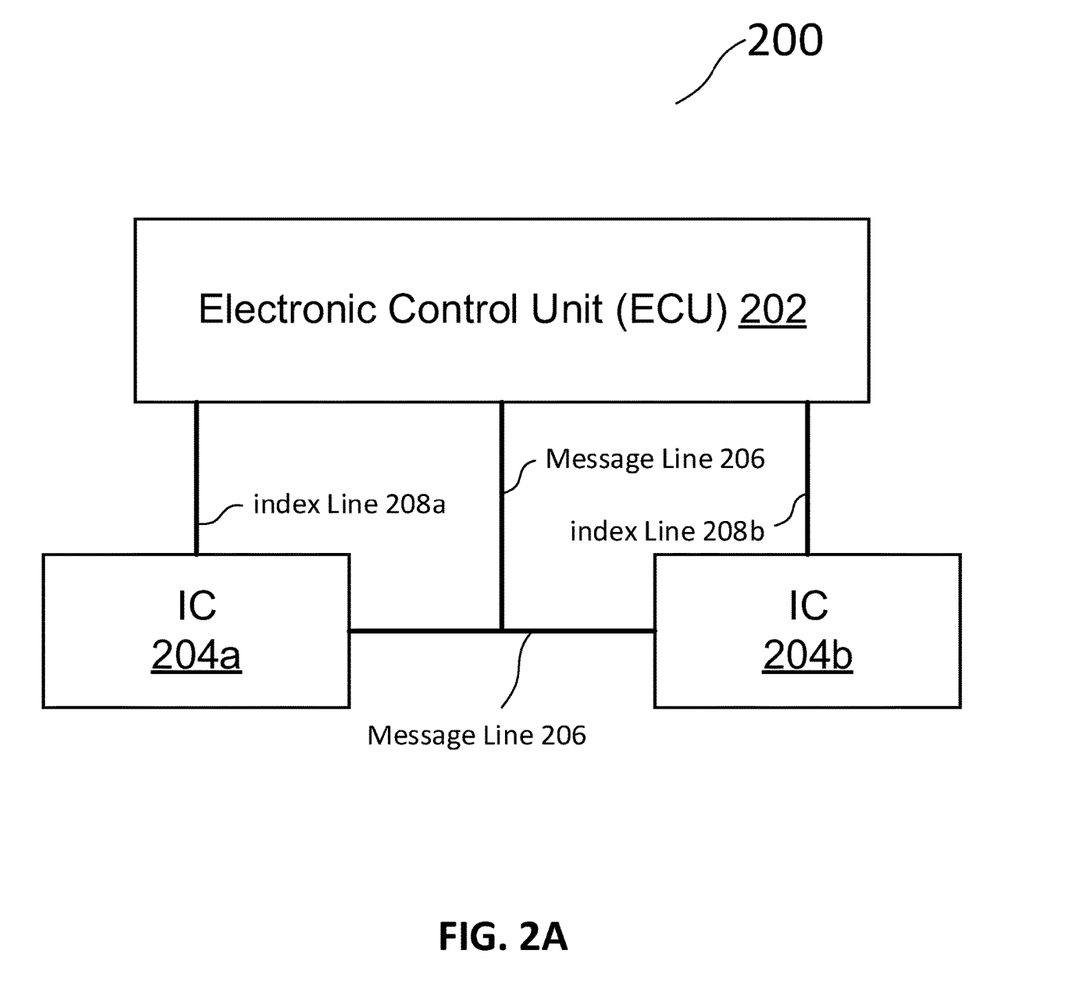
FIG. 2A is a block diagram of another example of a system to send absolute data and incremental data that includes an ECU and ICs with a shared message line.
Figure 2B:
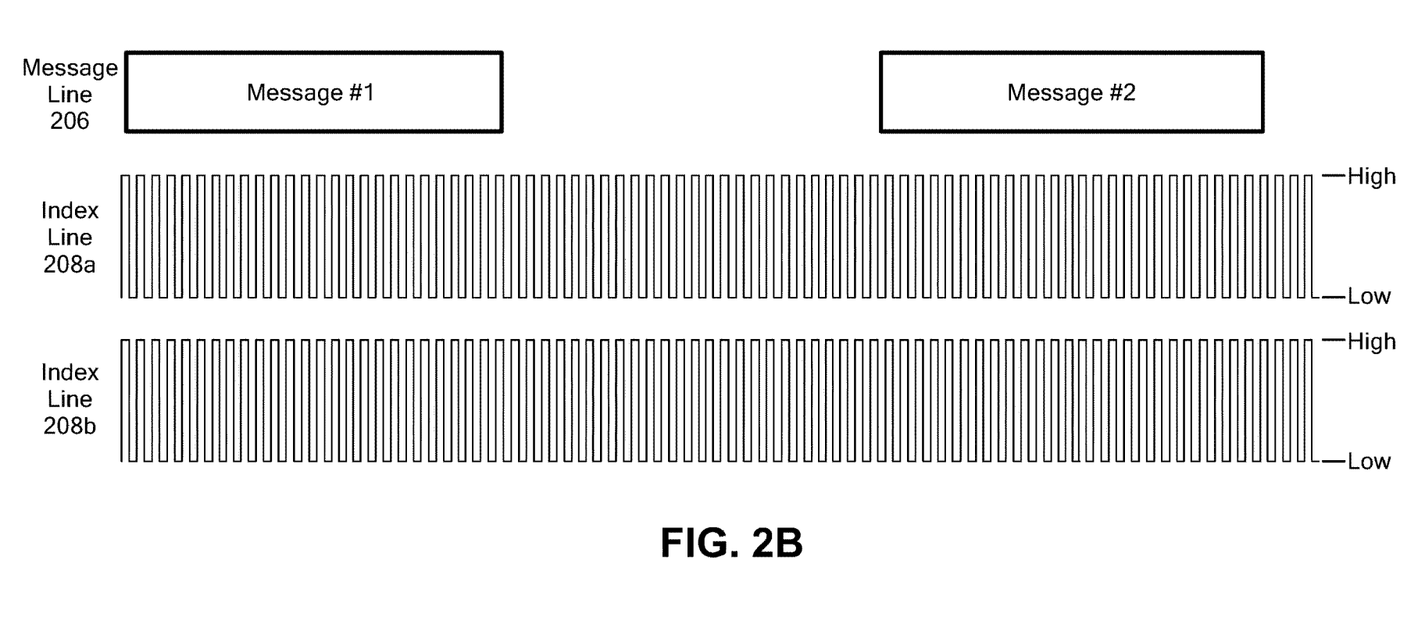
FIG. 2B is a diagram of example messages and signals of the system of FIG. 2A.

Referring to FIGS. 2A and 2B, another example of sending absolute data and incremental data is a system 200. The system 200 includes an ECU 202, a first IC 204*a* and a second IC 204*b*. In one example, the IC 204*a*, 204*b* may be sensors such as, for example, a current sensor, a speed sensor, an angle sensor, a magnetic field sensor, a temperature sensor, a pressure sensor, a chemical sensor, a motion sensor, a rotational direction sensor, a linear position sensor and so forth. In other examples, the ICs 204*a*, 204*b* may be a device providing sensing information received from an external sensor.

The IC 204*a*, 204*b* may be the same type of sensor (e.g., each are magnetic field sensors) or the IC 204*a*, 204*b* may be different types of sensors (e.g., one is a temperature sensor and the other is a magnetic sensor). The IC 204*a*, 204*b* may be monitoring the same or separate events.

A message line 206 connects the ECU 202 to the ICs 204*a*, 204*b*. An index line 208*a* connects the ECU 202 to the IC 204*a* and an index line 208*b* connects the ECU 202 to the IC 204*b*. In some examples, the message line 206 is similar to or the same as the message line 106 (FIG. 1). In some examples, the index lines 208*a*, 208*b* are similar to or the same as the index line 108 (FIG. 1).

In one particular example, in the system 200, each IC 204*a*, 204*b* sends their respective absolute data using the message line 206 taking turns to the ECU 202. The IC 204*a* provides incremental data to the ECU 202 using the index line 208*a* and the IC 204*b* provides incremental data to the ECU 202 using the index line 208*b*.

In some examples, the index lines 208*a*, 208*b* have two states (e.g., a high state and a low state). In some examples, the ICs 204*a*, 204*b* send incremental data to the ECU 202 in a similar manner as the IC 104 (FIG. 1). The ICs 204*a*, 204*b* transmit incremental data on the index lines 208*a*, 208*b* faster to the ECU 202 than the ICs 204*a*, 204*b* transmit absolute data on the message line 206 to the ECU 202. In some examples, the ICs 204*a*, 204*b* transmit incremental data on the index lines 208*a*, 208*b* at the same rate. In other examples, the ICs 204*a*, 204*b* transmit incremental data on the index lines 208*a*, 208*b* at a different rate from each other.

In another particular example, the ICs 204*a*, 204*b* may use their respective index line 208*a*, 208*b* to provide primary data to the ECU 202. The ICs 204*a*, 204*b* may use the message line 206 to provide redundant data to the primary data that was provided on the respective index line 208*a*, 208*b* and/or diagnostic data.

Figure 2C:
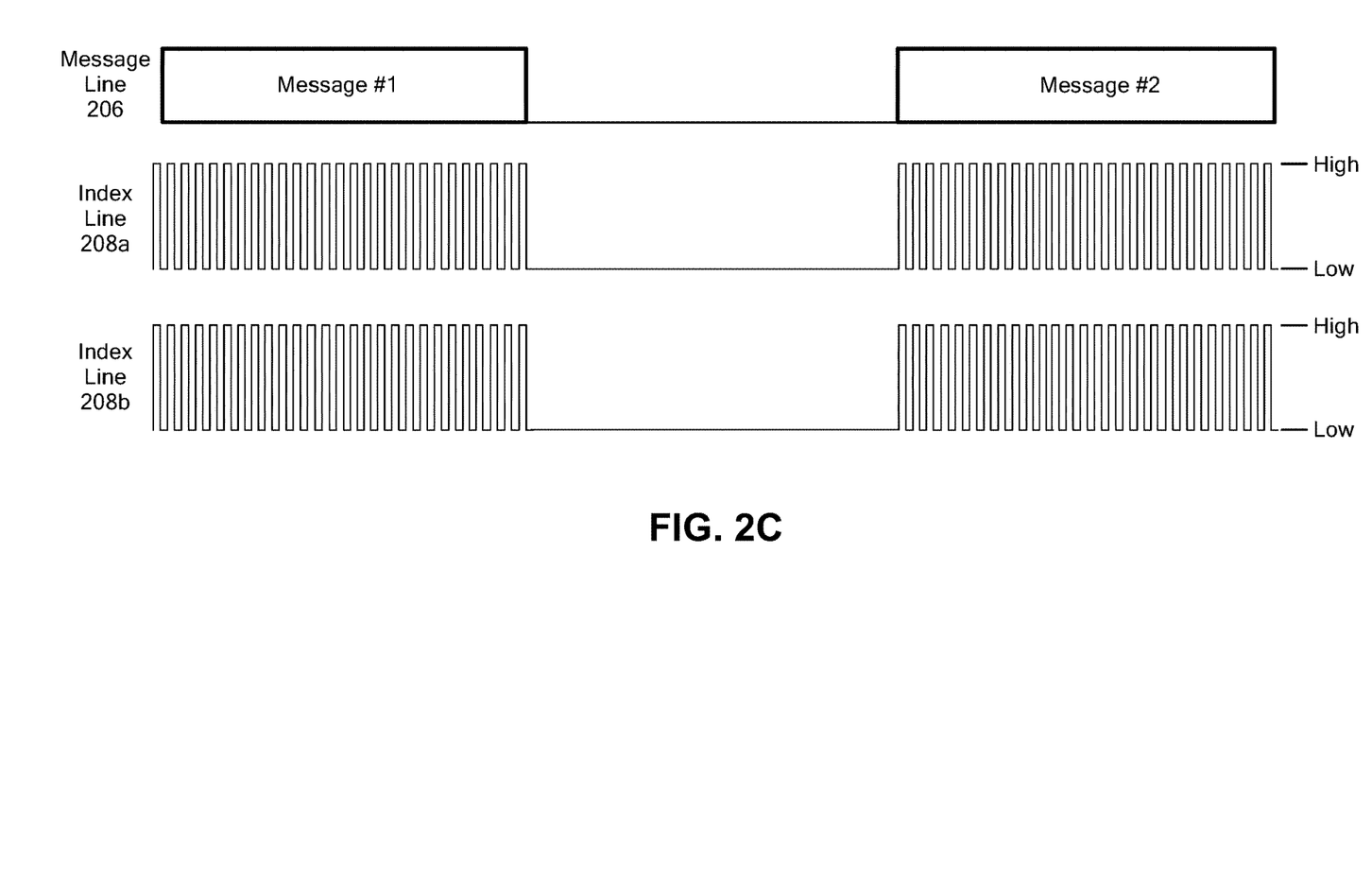
FIG. 2C is a diagram of another example messages and signals of the system FIG. 2A.

Referring to FIG. 2C, in another example similar to FIG. 2B, each IC 204*a*, 204*b* sends their respective data to the ECU 202 using the message line 206 taking turns. The IC 204*a* provides data to the ECU 202 using the index line 208*a* and the IC 204*b* provides data to the ECU using the index line 208*b*. Unlike as depicted in FIG. 2B, the start and stop of the data on the index lines 208*a*, 208*b* corresponds to the start and stop of a message on the message line 206.

Figure 2D:
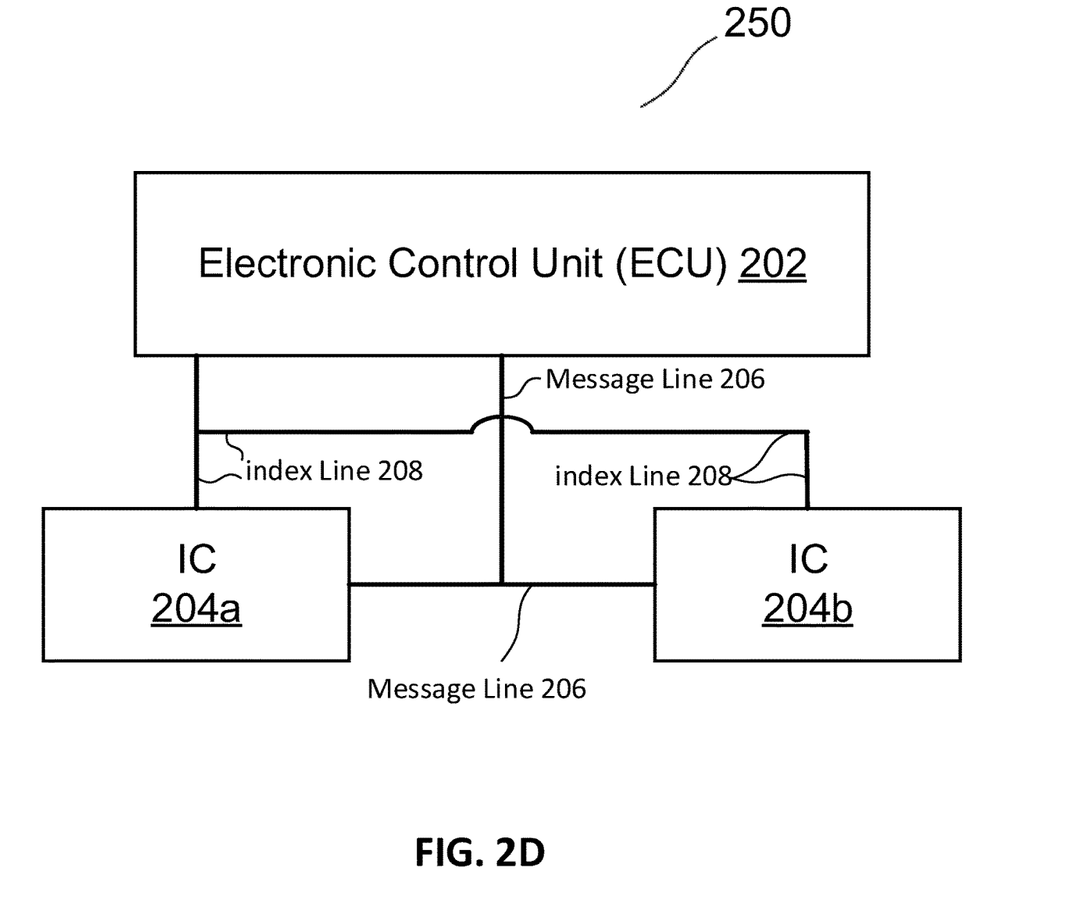
FIG. 2D is a block diagram of a further example of a system to send absolute data and incremental data that includes an ECU and ICs with a shared message line and shared index line.
Figure 2E:
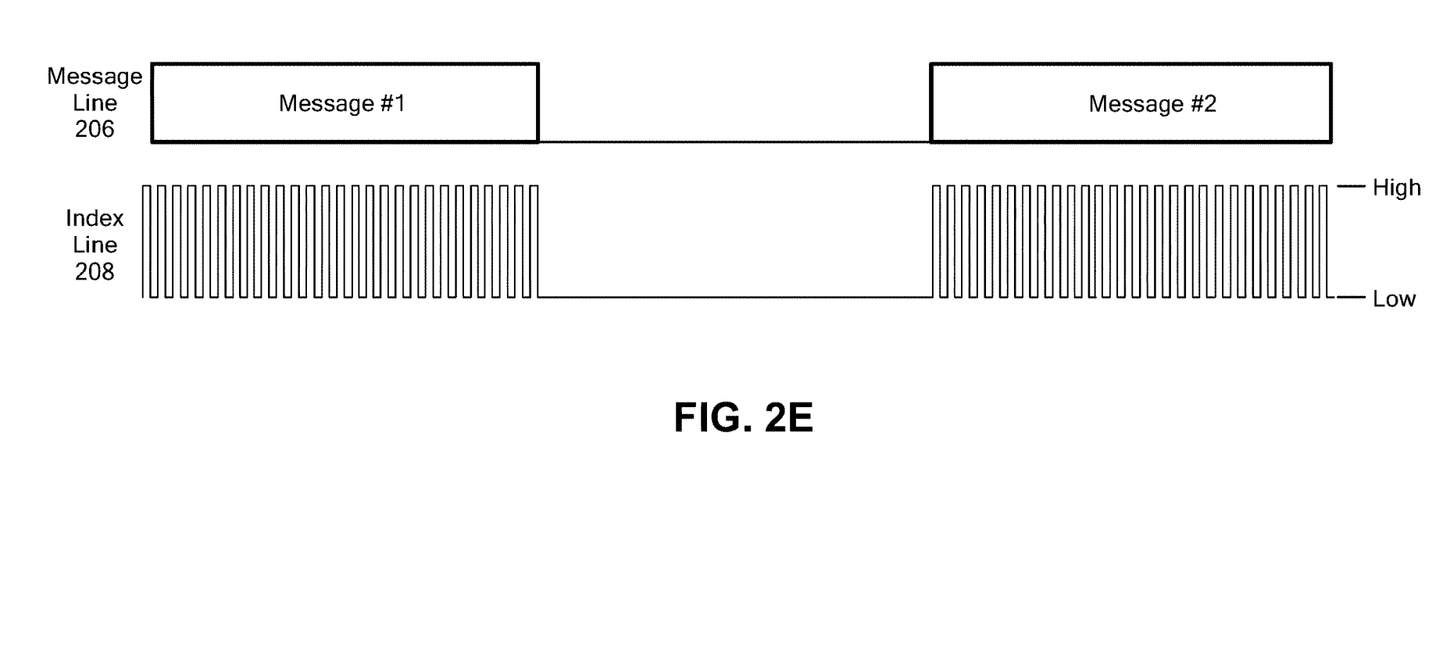
FIG. 2E is a diagram of example messages and signals of the system of FIG. 2D.

Referring to FIGS. 2D and 2E, a further example of sending absolute data and incremental data is a system 250. The system 250 is like the system 200 except the system 250 has a shared index line 208 that is shared by the ICs 204*a*, 204*b* to transmit incremental data to the ECU 202.

As each IC 204*a*, 204*b* sends its respective absolute data, each IC 204*a*, 204*b* is also sending incremental data on the index line 208 simultaneously. In one example, when a respective IC 204*a*, 204*b* stops sending its absolute data on the message line 206, the respective IC 204*a*, 204*b* also stops sending its incremental data on the index 208. Thus, the ECU 202 will receive the most updated data from the ICs 204*a*, 204*b*, since the absolute data may change once the transmission of the absolute data commences on the message line 206.

Figure 3:
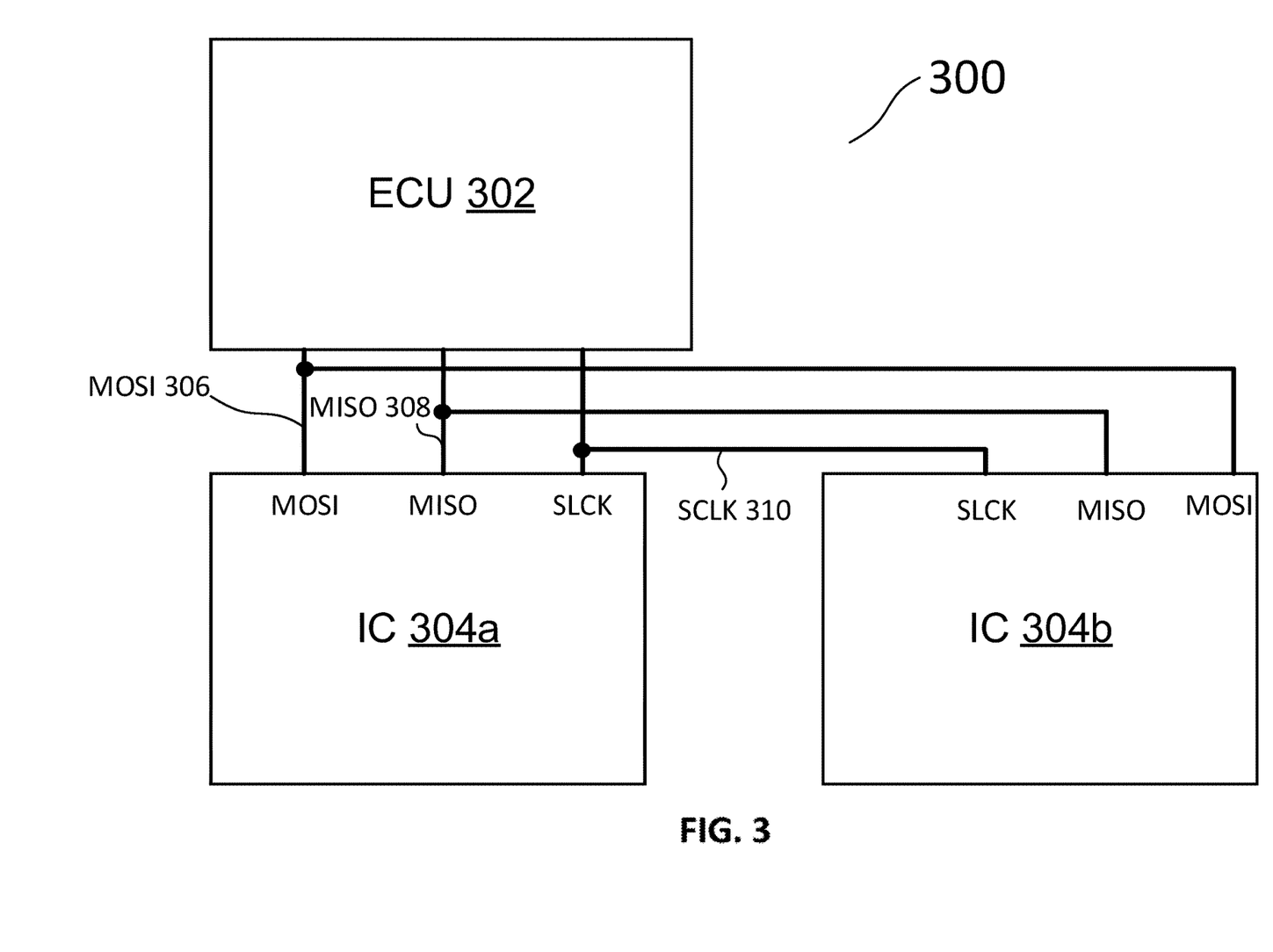
FIG. 3 is a block diagram of a system that includes an ECU and ICs.
Figure 4:
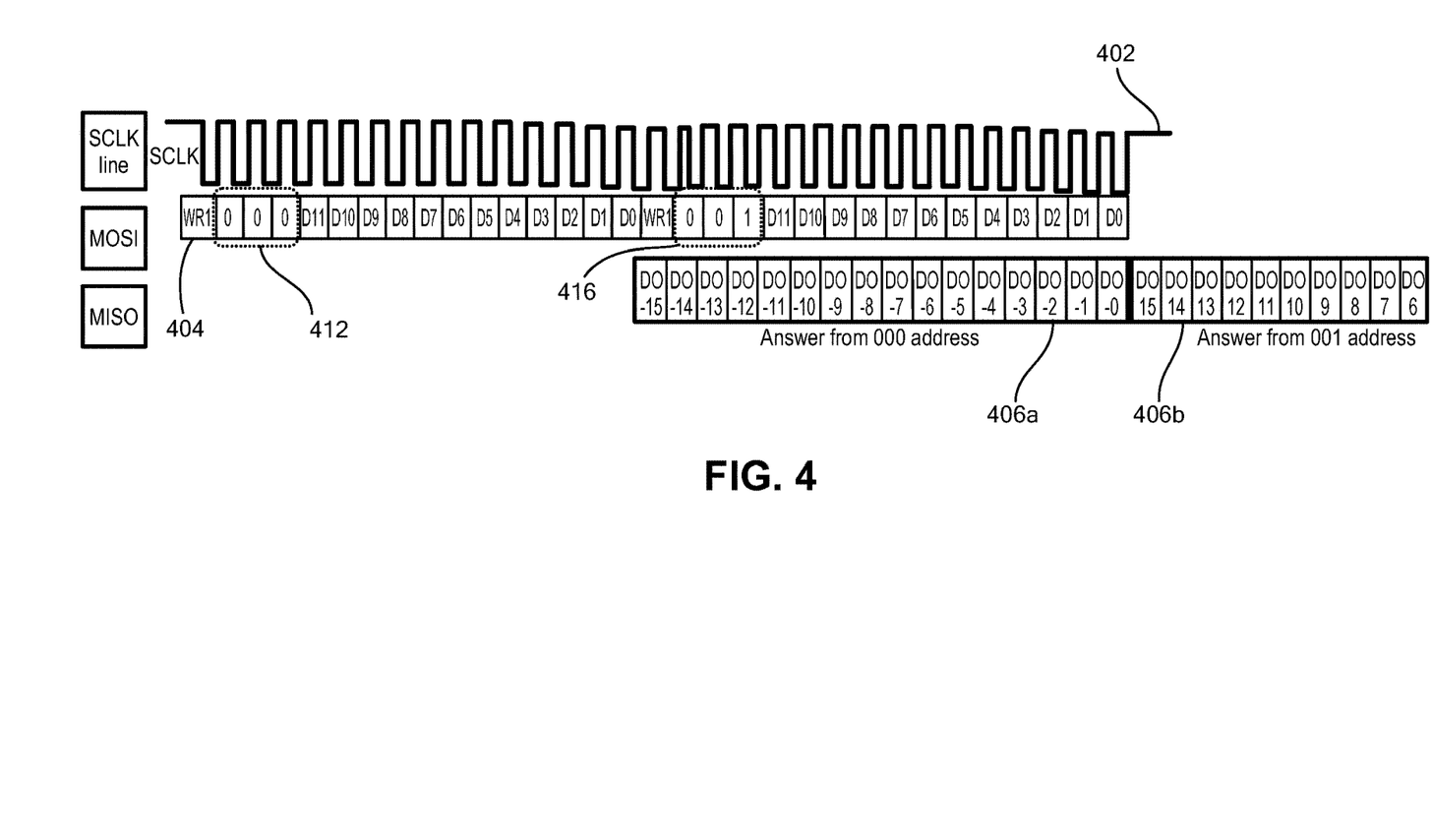
FIG. 4 is a diagram of an example of messages signals of the system of FIG. 3.

Referring to FIGS. 3 and 4, a system 300 includes an ECU 302 and ICs 304*a*, 304*b*. A MOSI (Master OUT Slave IN) line 306 connects the ICs 304*a*, 304*b* to the ECU 302. A MISO (Master In Slave Out) line 308 connects the ICs 304*a*, 304*b* to the ECU 302.

A SCLK (Serial Clock) line 310 connects the ICs 304*a*, 304*b* to the ECU 302. In one example, the ECU 302 provides a serial clock signal 402 using the SCLK line 310.

In one example, the IC 304*a*, 304*b* may be sensors such as, for example, a current sensor, a speed sensor, an angle sensor, a magnetic field sensor, a temperature sensor, a pressure sensor, a chemical sensor, a motion sensor, a rotational direction sensor, a linear position sensor and so forth. The IC 304*a*, 304*b* may be the same type of sensor (e.g., each are magnetic field sensors) or the IC 304*a*, 304*b* may be different types of sensors (e.g., one is a temperature sensor and the other is a temperature sensor). The IC 304*a*, 304*b* may be monitoring the same or separate events.

Using the MOSI line 306, the ECU 302 sends a signal 404 to the ICs 304a, 304b. The signal includes addresses of the ICs 304a, 304b. For example, the signal 402 includes an address 412 for the IC 304a and an address 416 for the IC 304b.

Using the MISO line 308, the IC 304a, after receiving the address 412, sends an answer 406a to the ECU 302. Using the MISO line 308, the IC 304b, after receiving the address 416, sends an answer 406b to the ECU 302.

Figure 5A:
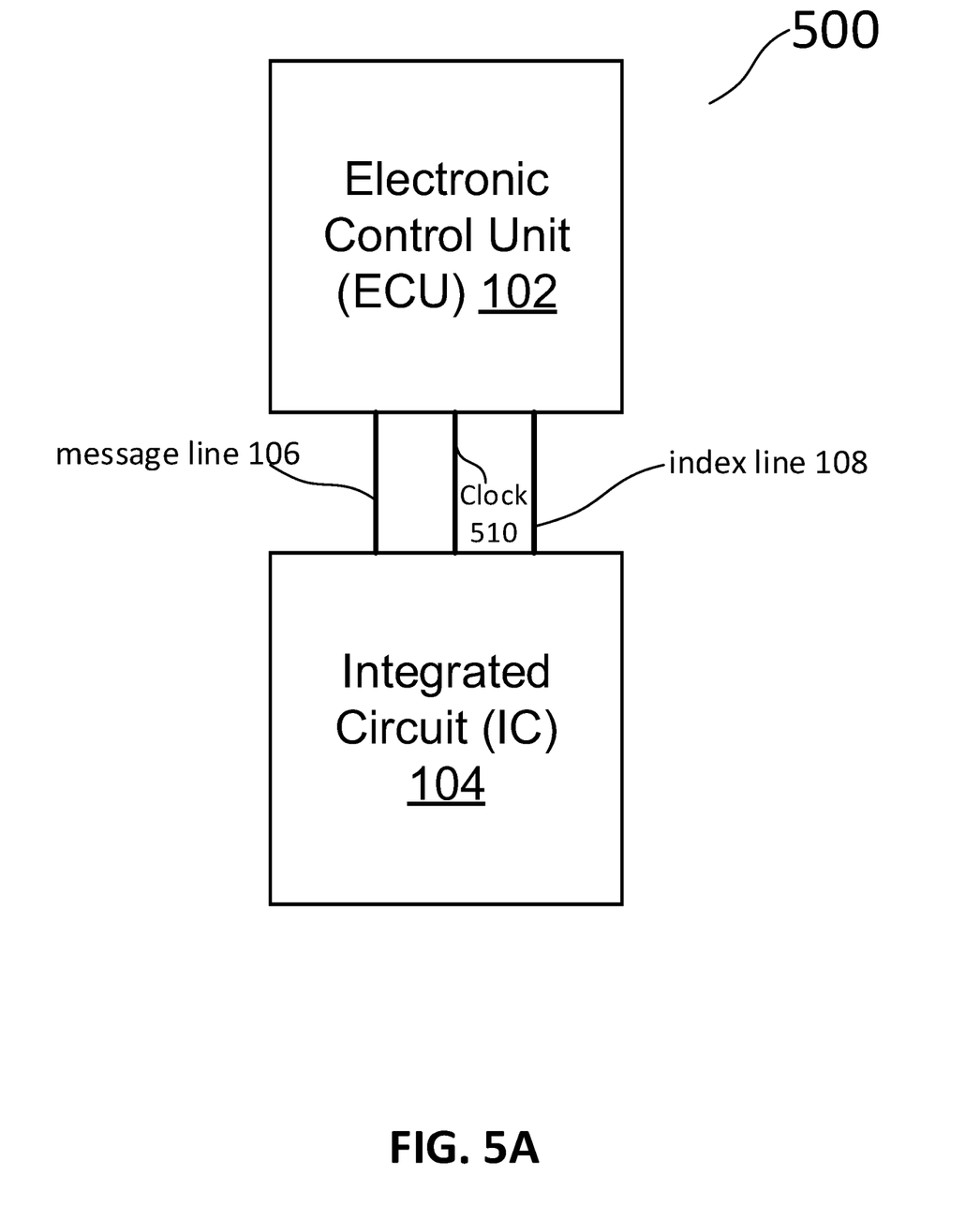
FIG. 5A is a diagram of a still further example of a system to send absolute data and incremental data.
Figure 5B:
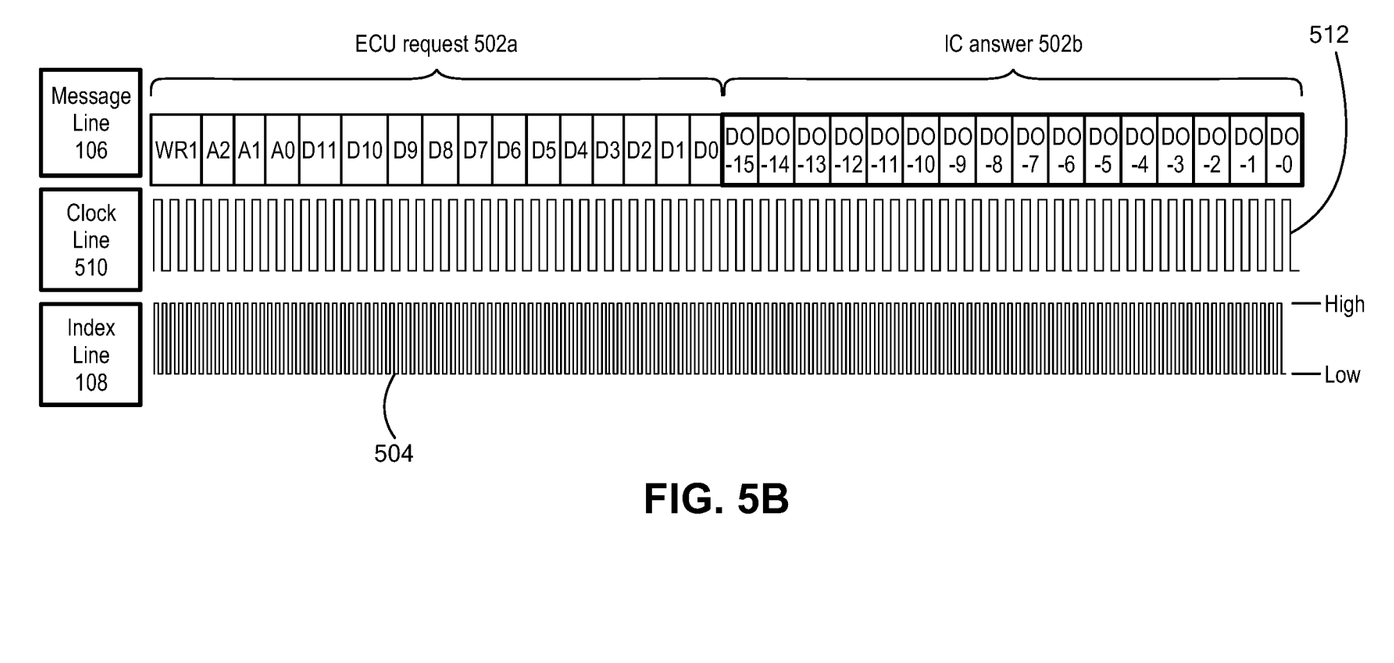
FIG. 5B is a diagram of an example of messages and signals of the system of FIG. 5A.

Referring to FIGS. 5A and 5B, a system 500 is similar to the system 100 (FIG. 1A) but has been modified to include a clock line 510 connecting the ECU 102 to the IC 104 and has been modified so that both the ECU 102 and the IC 104 both use the message line 106. For example, the ECU 102 sends an ECU Request 502a to request absolute data on the message line 106 and the IC 104 responds by sending an IC answer 502b on the message line 106 with the absolute data requested. The ECU 102 sends a clock signal 512 on the clock line 510 to the IC 104.

The IC 104 sends incremental data in a signal 504 on the index line 108 as described herein (e.g., as described in FIGS. 1A and 1). The IC 104 provides incremental data using the index line 108 at a faster rate than the IC 104 provides absolute data using the message line 106.

As described herein, the IC 104 inputs incremental data on the index line as incremental events occur. For example, if an IC 104 detects the speed of a wheel and if the speed is relatively slow, then the rate the IC 104 provides incremental data on the index line 108 is less than the rate the IC 104 would provide incremental data on the index line 108 if the speed of the wheel is relatively fast.

The ECU 102 will change the clock speed on the clock line 510 line depending on the index line 108. The clock signal 512 on the clock line 510 dictates the rate of the data on the message line 106. If the rate incremental data is inputted by the IC 104 on the index line 108 is increased, then the rate of messaging between the ECU 102 and the IC 104 on the message line 106 increases. If the rate incremental data is inputted by the IC 104 on the index line 108 is decreased, then the rate of messaging between the ECU 102 and the IC 104 on the message line 106 decreases.

The processes described herein are not limited to the specific examples described. For example, while FIGS. 2A, 2D, 3 and 5A only depict two ICs, one of ordinary skill in the art would recognize that any number of two ICs or more may be implemented using the techniques described herein. While the figures depicted herein show a single index line from each IC to the ECU, an IC may have multiple index lines connecting an IC to the ECU. In one example, these multiple index lines from an IC to the ECU may be used for redundancy of data. In another example, one or more of the multiple index lines from an IC to the ECU may be used for increasing absolute and/or one or more of the multiple index lines from an IC to the ECU may be used for decreasing absolute data. In one example, increasing absolute data may be increasing angle degrees. In another example, decreasing absolute data may be decreasing angle degrees.

Having described preferred embodiments, which serve to illustrate various concepts, structures and techniques, which are the subject of this patent, it will now become apparent to those of ordinary skill in the art that other embodiments incorporating these concepts, structures and techniques may be used.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A system, comprising:
an electronic control unit (ECU);
an integrated circuit (IC) configured to:
transmit, to the ECU, absolute data, corresponding to a parameter, on a message line at a first rate; and
transmit, to the ECU, incremental data, corresponding to the parameter, on an index line at a second rate, wherein the second rate is faster than the first rate,
wherein the incremental data comprises data with incremental changes to the absolute data.

2. The system of claim 1, wherein the IC is a device providing sensing information received from an external sensor.

3. The system of claim 1, wherein the IC is a sensor.

4. The system of claim 1, wherein the absolute data is an angle of a target and the incremental data is a change in the angle of the target.

5. The system of claim 1, wherein the absolute data is a position of a target and the incremental data is a change in the position of the target.

6. The system of claim 1, wherein the parameter is degree measurement.

7. The system of claim 1, wherein the parameter is magnetic field intensity.

8. The system of claim 1, wherein the message transmitted by the IC using a unidirectional signal format.

9. The system of claim 8, wherein the message transmitted by the IC using a bidirectional signal format.

10. The system of claim 8, wherein the IC transmits incremental data on the index line using two states.

11. A system, comprising:
an electronic control unit (ECU);
a first integrated circuit (IC) configured to:
transmit, to the ECU, absolute data on a message line at a first rate; and
transmit, to the ECU, incremental data on a first index line at a second rate, wherein the second rate is faster than the first rate; and
a second IC configured to transmit, to the ECU, incremental data on a second index line at a third rate, wherein the third rate is faster than the first rate,
wherein the incremental data comprises data associated with changes in the absolute data.

12. The system of claim 11, wherein the second rate and the third rate are equal.

13. The system of claim 11, wherein the second rate and the third rate are not equal.

14. The system of claim 11, wherein the second IC transmits absolute data on the message line to the ECU.

15. A system comprising:
an electronic control unit (ECU); and
a plurality of ICs, wherein each IC is configured to transmit, to the ECU, absolute data, corresponding to a parameter, on a message line at a first rate and incremental data, corresponding to the parameter, on a corresponding second line at a second rate,
wherein the incremental data includes data with incremental changes to the absolute data.

16. The system of claim 15, wherein the parameter is degree measurement.

17. The system of claim 15, wherein the parameter is magnetic field intensity.

18. The system of claim 15, wherein the IC is a device providing sensing information received from an external sensor.

19. The system of claim 15, wherein the IC is a sensor.

20. A system, comprising:
an electronic control unit (ECU);
a plurality of integrated circuits (IC) configured to:
transmit, to the ECU, primary data on a respective index line at a first rate; and
transmit, to the ECU, redundant data and/or diagnostic data on a message line at a second rate, wherein the second rate is slower than the first rate,
wherein the redundant data comprises the primary data.

21. The system of claim 20, wherein the IC is a device providing sensing information received from an external sensor.

22. The system of claim 20, wherein the IC is a sensor.

23. The system of claim 20, wherein the plurality of ICs is configured to transmit, to the ECU, redundant data and diagnostic data on a message line at a second rate.

24. A system, comprising:
an electronic control unit (ECU);
a plurality of integrated circuits (IC) configured to:
transmit, to the ECU, primary data on a respective first index line at a first rate; and
transmit, to the ECU, redundant and/or diagnostic data on a message line at a second rate, wherein the second rate is slower than the first rate,
wherein the redundant data comprises primary data, and
wherein data redundant to the primary data is transmitted by the ICs to the ECU on a respective second index line.

25. The system of claim 24, wherein each of the plurality of ICs is a sensor.

26. A system, comprising:
an electronic control unit (ECU);
an integrated circuit (IC) configured to:
transmit, to the ECU, absolute data on a message line at a first rate; and
transmit, to the ECU, incremental data on an index line at a second rate, wherein the second rate is faster than the first rate,
wherein the incremental data comprises data associated with changes in the absolute data,
wherein the index line is a first index line,
wherein data redundant to the incremental data is transmitted on a second index line from the IC to the ECU.

27. The system of claim 26, wherein the IC is a sensor.

28. A system, comprising:
an electronic control unit (ECU);
an integrated circuit (IC) configured to:
transmit, to the ECU, absolute data on a message line at a first rate; and
transmit, to the ECU, incremental data on an index line at a second rate, wherein the second rate is faster than the first rate,
wherein the incremental data comprises data associated with changes in the absolute data, and
wherein, if the message line is broken, then the ECU 102 uses the index line to confirm a constant position change and/or calculate a speed of the change.

29. The system of claim 28, wherein the IC is a sensor.

30. A system, comprising:
an electronic control unit (ECU);
a first integrated circuit (IC) configured to:
transmit, to the ECU, absolute data on a message line at a first rate; and
transmit, to the ECU, incremental data on an index line at a second rate, wherein the second rate is faster than the first rate; and
a second IC configured to:
transmit, to the ECU, absolute data on the message line; and
transmit, to the ECU, incremental data on the index line at a third rate, wherein the third rate is faster than the first rate,
wherein the incremental data comprises data associated with changes in the absolute data.

31. The system of claim 30, wherein the first IC and the second IC are each a sensor.

32. A system, comprising:
an electronic control unit (ECU);
an integrated circuit (IC) configured to:
transmit, to the ECU, absolute data on a message line at a first rate; and
transmit, to the ECU, incremental data on an index line at a second rate, wherein the second rate is faster than the first rate,
wherein the incremental data comprises data associated with changes in the absolute data, and
wherein, if the index line is broken, then the ECU receives a position signal from the message line.

33. The system of claim 32, wherein each of the plurality of ICs is a sensor.

34. A system, comprising:
an electronic control unit (ECU);
a plurality of integrated circuits (IC) configured to:
transmit, to the ECU, primary data on a respective index line at a first rate; and
transmit, to the ECU, redundant and/or diagnostic data on a message line at a second rate, wherein the second rate is slower than the first rate,
wherein the redundant data comprises primary data, and
wherein a start and stop of transmitting the primary data corresponds with a start and stop of transmitting the redundant and/or diagnostic data.

35. The system of claim 34, wherein each of the plurality of ICs is a sensor.

* * * * *

UNITED STATES PATENT AND TRADEMARK OFFICE
CERTIFICATE OF CORRECTION

Page 1 of 2

PATENT NO. : 11,368,533 B2
APPLICATION NO. : 16/952215
DATED : June 21, 2022
INVENTOR(S) : Nevenka Kozomora et al.

It is certified that error appears in the above-identified patent and that said Letters Patent is hereby corrected as shown below:

In the Specification

Column 1, Line 25, delete "IC configured" and replace with --IC is configured--.

Column 2, Line 9, delete "messages signals" and replace with --messages and signals--.

Figure 1B:
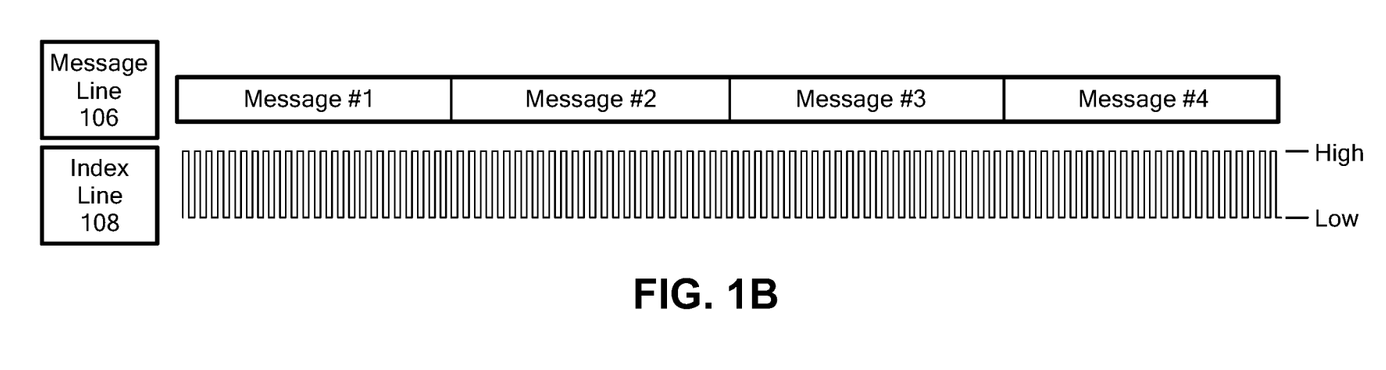
FIG. 1B is a diagram of example messages and signals of the system of FIG. 1A.

Column 2, Line 25, delete "to FIG. 1, a" and replace with --to FIG. 1A, a--.

Column 2, Line 37, delete "line 104 connects" and replace with --line 108 connects--.

Column 2, Line 66, delete "index lines 108" and replace with --index line 108--.

Column 3, Line 4, delete "lines 108" and replace with --line 108--.

Column 3, Line 18, delete "index 108" and replace with --index line 108--.

Column 3, Line 50, delete "IC 204a, 204b" and replace with --ICs 204a, 204b--.

Column 3, Line 58, delete "IC 204a, 204b" and replace with --ICs 204a, 204b--.

Column 3, Line 59, delete "IC 204a, 204b" and replace with --ICs 204a, 204b--.

Column 3, Lines 61-62, delete "IC 204a, 204b" and replace with --ICs 204a, 204b--.

Column 4, Line 25, delete "index line" and replace with --index lines--.

Column 4, Line 31, delete "ECU using" and replace with --ECU 202 using--.

Column 4, Line 45, delete "index 208." and replace with --index line 208.--.

Signed and Sealed this
Eighth Day of August, 2023

Katherine Kelly Vidal
*Director of the United States Patent and Trademark Office*

CERTIFICATE OF CORRECTION (continued)
U.S. Pat. No. 11,368,533 B2

Column 4, Line 63, delete "IC 304a, 304b" and replace with --ICs 304a, 304b--.

Column 4, Line 64, delete "IC 304a, 304b" and replace with --ICs 304a, 304b--.

Column 4, Lines 66-67, delete "IC 304a, 304b" and replace with --ICs 304a, 304b--.

Column 5, Line 53, delete "absolute and/or" and replace with --absolute data and/or--.